May 31, 1960     J. A. GAYLORD     2,938,254
WEBBING ADAPTER
Filed Nov. 10, 1958
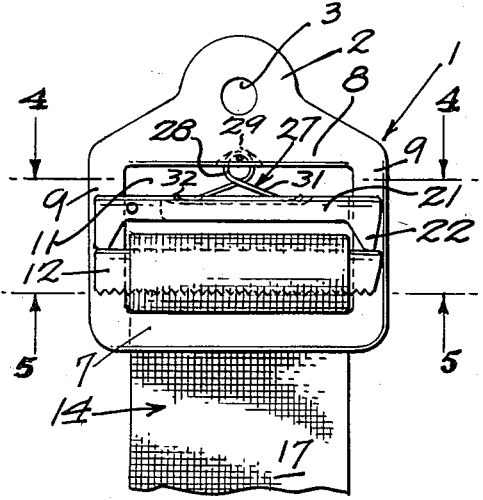
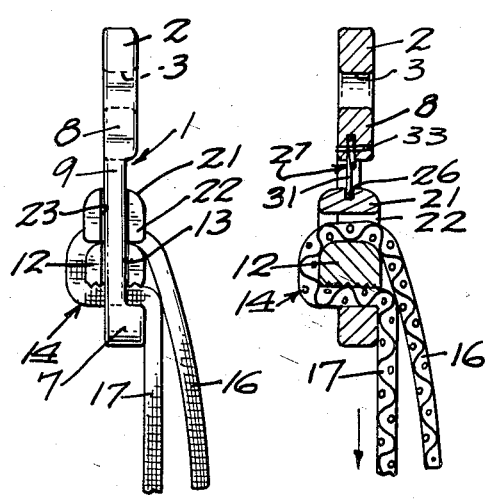
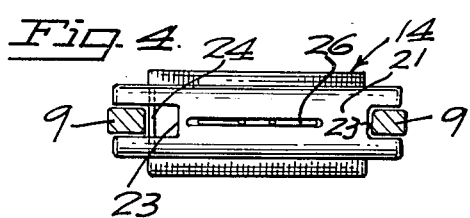
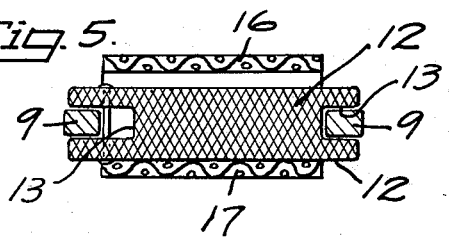
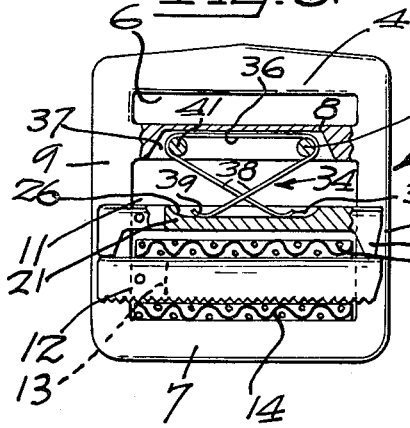
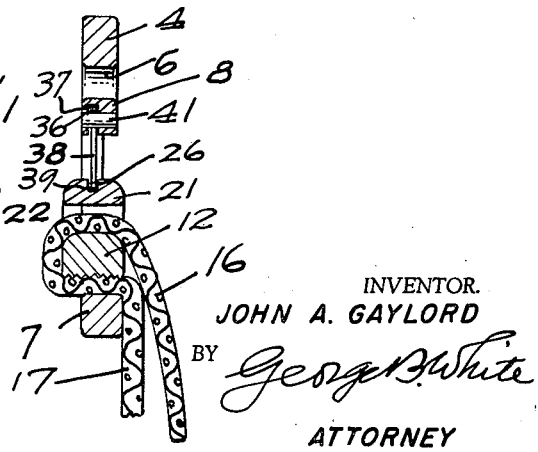
INVENTOR.
JOHN A. GAYLORD
BY *George B. White*
ATTORNEY

United States Patent Office 2,938,254
Patented May 31, 1960

2,938,254
WEBBING ADAPTER

John A. Gaylord, San Rafael, Calif., assignor to H. Koch & Sons, Corte Madera, Calif., a partnership Filed Nov. 10, 1958, Ser. No. 772,939

5 Claims. (Cl. 24—171)

This invention relates to a webbing adapter.

The usual adapters or buckles used on webs or straps for adapting the webs or straps to any suitable length or tightness have the disadvantage that when turned upside down or when subjected to certain forces, loosen the grip on the web and allow the web to slip.

It is the primary object of this invention to provide means in such webbing adapters for positively holding the clamping or web retaining element of the webbing adapter engaged with the web yet be sufficiently yieldable to permit manipulation and release of the clamping element at will.

Particularly it is an object of the invention to provide a resiliently yieldable tension device to positively hold the clamping bar or web retaining bar of a webbing adapted in web retaining position in any attitude of the webbing and of the webbing adapter.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a front elevational view of a webbing adapter with tension device thereon.

Fig. 2 is a side view of said webbing adapter.

Fig. 3 is a cross-sectional view of said webbing adapter.

Fig. 4 is a sectional view of said webbing adapter, the section being taken on lines 4—4 of Fig. 1.

Fig. 5 is another sectional view of said webbing adapter, the section being taken on lines 5—5 of Fig. 1.

Fig. 6 is a front elevational view of a webbing adapter with web engaging slot and with wide looped spring in the tension device.

Fig. 7 is a sectional view of the webbing adapter shown in Fig. 6.

The usual webbing adapter is a kind of buckle which permits slip or slide adjustment of webs or straps thereon. Positive holding of the web at adjusted length or tension is particularly important in webbing of parachutes where the adapter or buckle assumes various, sometimes unexpected, attitudes and positions yet firm attachment of the web is imperative in all such attitudes.

The usual webbing adapter includes a generally rectangular frame 1 provided with a loop for a strap or suspension line. The loop 2 in Fig. 1 is formed as a round hole 3 for a strap or line. The loop 4 in Fig. 6 is formed as an elongated slot 6 for a wider web or strap. The rectangular frame 1 in each includes cross members 7 and 8 connected by vertical sides 9 so as to inclose a generally rectangular space 11. Near the lower crossmember 7 farthest from the respective loop, on which latter the adapter is usually suspended, is a web retaining bar or clamping bar 12. Each end of the web retaining bar 12 has a vertical slot 13 therein so as to straddle the adjacent vertical side 9 of the frame and be slidable along the sides 9 toward and away from the lower cross member 7. The lower face of the web retaining bar 12 is suitably serrated for gripping a web or strap 14 between it and the lower cross member 7. Usually the web 14 is inserted between the retaining bar 12 and the lower cross member 7 and is then played around the top of the retaining bar 12 and upon itself so that a pull exerted on the upper branch 16 of the web 14 presses down the retaining bar 12 on the lower branch 17 of the web 14 and thereby tightens the grip thereon. When the frame 1 is inverted or when the pressure and tension conditions change in a peculiar manner, the retaining bar 12 frequently loosens its grip and allows the web 14 to slip. In critical situations, such as suspension from a parachute, such slippage of the web may be extremely dangerous and damaging.

The tension device to prevent accidental loosening of the grip on the web includes a tension bar 21 located between the retaining bar 12 and the top cross member 8. Projections 22 extend from each end of the tension bar 21 toward the retaining bar 12 and bear against the latter outside of and beyond the respective edges of the web 14 so as to space the intermediate portion of the tension bar 21 from the upper branch 16 of the web 14 on the top of the retaining bar 12.

In each end of the tension bar 21 is a vertical slot 23 forming a fork or yoke slidable on the respective sides 9. One of the vertical slots 23 is deeper than the other so as to facilitate assembly, and a pin 24 extended across this deeper slot after assembly prevents longitudinal shifting of the tension bar 21.

In the top of the tension bar 21 is a longitudinal slot 26 facing toward the top cross member 8 of the frame. In the bottom or lower face of the top cross member 8 is a slot facing the tension bar slot 26 so that a spring can be nested in said slots for urging the tension bar 21 against the web retaining bar 12. The shape or size of the slot in the top cross member 8 varies according to the type of spring used.

In each instance herein the spring is a wire spring bent into an anchor loop from which extend legs, crossing each other, with the ends of the legs bearing in the tension bar slot 26.

In Fig. 1 the spring 27 is formed with a circular hinge or anchor loop 28 nested in a short slot 29 in the bottom of the upper cross member 8. Legs 31 are crossed to form said hinge loop 28. The end of each leg 31 is curved slightly outwardly to form a bearing foot 32 nesting in the tension bar socket 26. An anchor pin 33 extends transversely across the short slot 29 and through the loop 28 so as to anchor the spring loop 28.

In Fig. 6 the spring 34 has an elongated loop 36 nested in an elongated slot 37 in the bottom of the top cross member 8. From opposite ends of the loop extend crossing legs 38 with curved feet 39 nesting in the tension bar slot 26. A pair of spaced anchor pins 41 extend across the elongated slot 37 through the respective ends of the flat loop 36 and anchor said flat loop 36.

In each instance the spring yieldably forces the tension bar 21 against the web retaining bar 12 to hold the latter against accidental displacement, yet permits manipulation for inserting the web in position as shown.

I claim:

1. In a webbing adapter, a frame having at least a cross bar and spaced sides extending from the cross bar, and a web retaining bar having one side thereof parallel with said cross bar and being slidably held on said sides, gripping means on said side of the retaining bar adjacent said cross bar for securely gripping a web, said retaining bar accommodating a web played around it, a yieldable tension device for holding said retaining bar in clamping position comprising a tension bar slidable on said frame sides and engageable with said retaining bar, and resilient means on said frame to urge said tension bar against said retaining bar to hold said retaining bar in clamping position, spaced engagement projections at the ends of said tension bar bearing against said retaining bar and spacing the portion of said tension bar between said projections from said retaining bar.

2. In a webbing adapter, a generally rectangular frame including spaced cross members connected by spaced sides, a web retaining bar slidable on the sides to clamp a web against one of said cross members, a tension bar, the ends of said tension bar having slots therein slidable on said sides between said retaining bar and the other cross member, projections on said slotted ends of said tension bar bearing against said retaining bar and spacing said tension bar from said retaining bar; and a spring between said tension bar and said other cross-member to hold said tension bar against said web retaining bar.

3. The webbing adapter defined in claim 2, said tension bar and said other cross member having opposite longitudinal slots in their respective sides facing one another, and the respective ends of said spring being nested in said slots.

4. The webbing adapter defined in claim 3, and anchor elements in the slot of said other cross member for anchoring said spring therein.

5. The webbing adapter defined in claim 2, said tension bar and said other cross member having opposite longitudinal slots in their respective sides facing one another, said spring being a wire spring with a loop having legs extending therefrom, the loop forming one end and the ends of said legs crossing each other from said loop forming the other end thereof, means in the slot of said other cross member to anchor said loop, and feet portions formed on said ends of said spring legs bearing against said tension bar in the slot of said tension bar.

References Cited in the file of this patent
UNITED STATES PATENTS

| | | |
|---|---|---|
| 248,105 | McKibben | Oct. 11, 1881 |
| 837,650 | Van Alstyn | Dec. 4, 1906 |
| 1,136,610 | Pilkington | Apr. 20, 1915 |
| 1,689,977 | Stirton | Oct. 30, 1928 |

FOREIGN PATENTS

| | | |
|---|---|---|
| 141,682 | Australia | June 19, 1951 |